United States Patent
Kasuga et al.

(10) Patent No.: US 7,218,030 B2
(45) Date of Patent: May 15, 2007

(54) OSCILLATING APPARATUS

(75) Inventors: Toshinori Kasuga, Kawasaki (JP); Yukio Ozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/182,753

(22) Filed: Jul. 18, 2005

(65) Prior Publication Data

US 2006/0208615 A1    Sep. 21, 2006

(30) Foreign Application Priority Data

Mar. 15, 2005    (JP) ............... 2005-072842

(51) Int. Cl.
*H01L 41/09* (2006.01)
(52) U.S. Cl. .................. 310/317; 310/316.01
(58) Field of Classification Search ............... 310/317, 310/316.01, 316.02
See application file for complete search history.

(56) References Cited

U.S. PATENT DOCUMENTS

| 4,965,532 A | * | 10/1990 | Sakurai | 331/4 |
| 5,539,346 A | | 7/1996 | Goto | |
| 5,705,957 A | * | 1/1998 | Oka et al. | 331/66 |
| 6,569,109 B2 | | 5/2003 | Sakurai et al. | |
| 6,761,690 B2 | | 7/2004 | Sakurai et al. | |
| 2004/0162509 A1 | | 8/2004 | Sakurai et al. | |

FOREIGN PATENT DOCUMENTS

| JP | 7-202692 A | 8/1995 |
| JP | 2000-42490 A | 2/2000 |
| JP | 2001-75522 A | 3/2001 |
| JP | 2001-340809 A | 12/2001 |

* cited by examiner

*Primary Examiner*—Darren Schuberg
*Assistant Examiner*—Derek Rosenau
(74) *Attorney, Agent, or Firm*—Arent Fox LLP.

(57) ABSTRACT

An oscillating apparatus includes a driver generating a waveform signal based on a stored data for specifying a waveform so as to output the waveform signal to a transducer. A detector detects a phase difference between electric voltage and current supplied to the transducer. A memory unit holds gain data reflecting a characteristic of the transducer. The gain data specify gains corresponding to respective phase differences. An arithmetic unit calculates the frequency of the waveform based on the phase difference detected at the detector and a gain included in the gain data. The oscillating apparatus enables determination of a gain suitable to the transducer in view of the characteristic of the transducer. The frequency of the waveform signal is allowed to follow the change in the resonant frequency in a shorter period. The oscillation can thus be kept well.

7 Claims, 3 Drawing Sheets

OSCILLATING APPARATUS

BACKGROUND OF THE INVENTION

1. Field of the Invention

The present invention relates to an oscillating apparatus such as an ultrasonic oscillator. In particular, the invention relates to an ultrasonic oscillator applicable to an ultrasonic bonding machine.

2. Description of the Prior Art

An ultrasonic oscillator is well known as disclosed in Japanese Patent Application Publication No. 2001-340809. The ultrasonic oscillator utilizes a direct digital synthesizer, DSS, for generating a waveform signal. A digital phase lock loop (PLL) circuit is connected to the direct digital synthesizer. This structure allows the driving signal output from the direct digital synthesizer to follow the change in the resonant frequency of the transducer even if the resonant frequency varies. The oscillation of the transducer can in this manner be maintained. A larger gain of the phase lock loop circuit enables a quick response of the driving signal to the change in the resonant frequency.

A so-called ultrasonic bonding machine is well known in the technical field of the circuit chip mounting. The phase lock loop circuit is connected to the transducer of a so-called ultrasonic head in the ultrasonic bonding machine. If the gain of the phase lock loop circuit is excessively larger, the ultrasonic head cannot follow the change in the frequency, so that the action of the ultrasonic head gets disordered. On the other hand, if the gain of the phase lock loop circuit gets smaller, the driving frequency for the ultrasonic head cannot reach the target resonant frequency in a shorter period. The driving signal for the ultrasonic head accordingly cannot be raised.

SUMMARY OF THE INVENTION

It is accordingly an object of the present invention to provide an oscillating apparatus contributing to realization of a higher driving frequency applied to an ultrasonic head.

According to the present invention, there is provided an oscillating apparatus comprising: a transducer; a driver connected to the transducer, said driver generating a waveform signal based on a stored data for specifying a waveform so as to output the waveform signal to the transducer; a detector designed to detect a phase difference between electric voltage and current supplied to the transducer; a memory unit holding gain data reflecting a characteristic of the transducer, said gain data specifying gains corresponding to respective phase differences; and an arithmetic unit designed to calculate the frequency of the waveform based on the phase difference detected at the detector and a gain included in the gain data.

The oscillating apparatus enables determination of a gain suitable to the transducer in view of the characteristic of the transducer. The frequency of the waveform signal is allowed to follow the change in the resonant frequency in a shorter period. The oscillation can thus be kept well. Determination of a maximum gain leads to realization of a higher frequency of the waveform signal. If the oscillating apparatus is employed in an ultrasonic bonding machine, for example, the ultrasonic head is allowed to enjoy the driving signal of a higher frequency.

The oscillating apparatus may further comprise a processing unit designed to update the gain data in the memory unit. Suitable gains can be set in view of the required resonant frequency in the oscillating apparatus of the type. Otherwise, the oscillating apparatus may allow employment of a bolt clamped Langevin type transducer as the transducer. The clamping force of the clamp may be utilized to set the resonant frequency in the bolt clamped Langevin type transducer. The stored data may be set in accordance with the set frequency.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
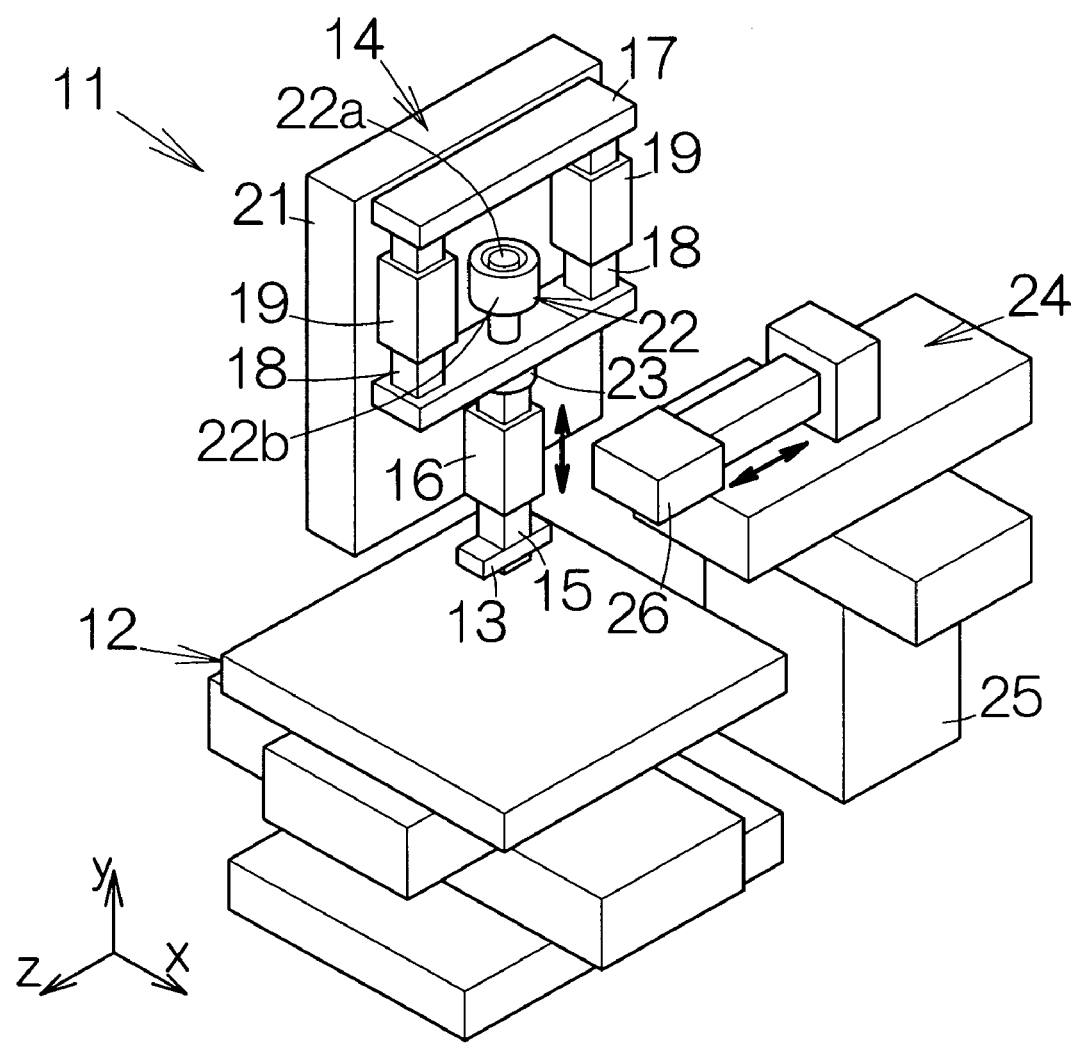
FIG. 1 is a perspective view schematically illustrating the entire structure of an ultrasonic bonding machine.

FIG. 1 schematically illustrates an ultrasonic bonding machine 11 according to an embodiment of the present invention. The ultrasonic bonding machine 11 includes a work table 12 defining the upper flat surface along a predetermined horizontal plane. The work table 12 is allowed to move within the horizontal plane. An ultrasonic head 13 is opposed to the upper flat surface of the work table 12.

Here, the xyz-coordinate system is established in the ultrasonic bonding machine 11. They y-axis of the xyz-coordinate system extends in the direction perpendicular to the upper flat surface of the work table 12, namely to the horizontal plane. The work table 12 is positioned within the horizontal plane based on the x-coordinate and the z-coordinate of the xyz-coordinate system. A relative position can in this manner be determined between the ultrasonic head 13 and the work table 12 along the horizontal plane.

A pressure apparatus 14 is connected to the ultrasonic head 13. The pressure apparatus 14 includes a support shaft 15 for supporting the ultrasonic head 13 at the tip or lower end. The support shaft 15 has the longitudinal axis in parallel with they y-axis of the xyz-coordinate system. The support shaft 15 may be made of a metallic material, for example. A first guide 16 is employed to support the support shaft 15 for relative movement therebetween in the vertical direction.

The first guide 16 is a so-called non-contact guide, for example. The non-contact guide is designed to effect a predetermined force to the peripheral surface of the support shaft 15 from at least pairs of directions. The predetermined force may include force such as magnetic force based on atoms, static pressure based on fluid such as air, or the like. Here, the first guide 16 employs static pressure based on air.

A movable member 17 is coupled to the support shaft 15. Here, the movable member 17 includes a pair of guide shaft 18, 18. The individual guide shaft 18 has the longitudinal axis in parallel with the y-axis of the xyz-coordinate system. The guide shafts 18 may be made of a metallic material, for example. Second guides 19 are employed to respectively support the guide shafts 18 for relative movement therebetween in the vertical direction. The second guides 19 are likewise a so-called non-contact guide. The first and second guides 16, 19 may be fixed to a common support member 21. The support member 21 stays still even during the movement of the movable member 17.

A drive source or voice coil motor 22 is connected to the movable member 17. The voice coil motor 22 includes a columnar permanent magnet 22a stationary to the movable member 17, for example. A cylindrical coil 22b is fixed to the support member 21. The coil 22b is designed to surround the outer cylindrical surface of the permanent magnet 22a. When electric current is supplied to the coil 22b, the movable member 17 and the support shaft 15 is driven to move in the direction of the y-axis.

A force sensor 23 is interposed between the support shaft 15 and the movable member 17. The force sensor 23 is designed to detect a force or load acting on the support shaft 15 from the movable member 17 in the direction of the y-axis. The load corresponds to a pressure transmitted to the work table 12 from the ultrasonic head 13. A load cell, a piezoelectric element, or the like, may be employed as the force sensor 23, for example.

An image capturing apparatus 24 is related to the work table 12 and the pressure apparatus 14. The image capturing apparatus 24 is supported on a base 25 for movement in the horizontal direction. The image capturing apparatus 24 includes a camera unit 26 designed to capture images. When the image capturing apparatus 24 moves in the horizontal direction, the camera unit 26 is positioned in a space between the ultrasonic head 13 and the work table 12. The camera unit 26 thus serves to simultaneously capture an image of the ultrasonic head 13 and an image of the upper flat surface of the work table 12.

Figure 2:
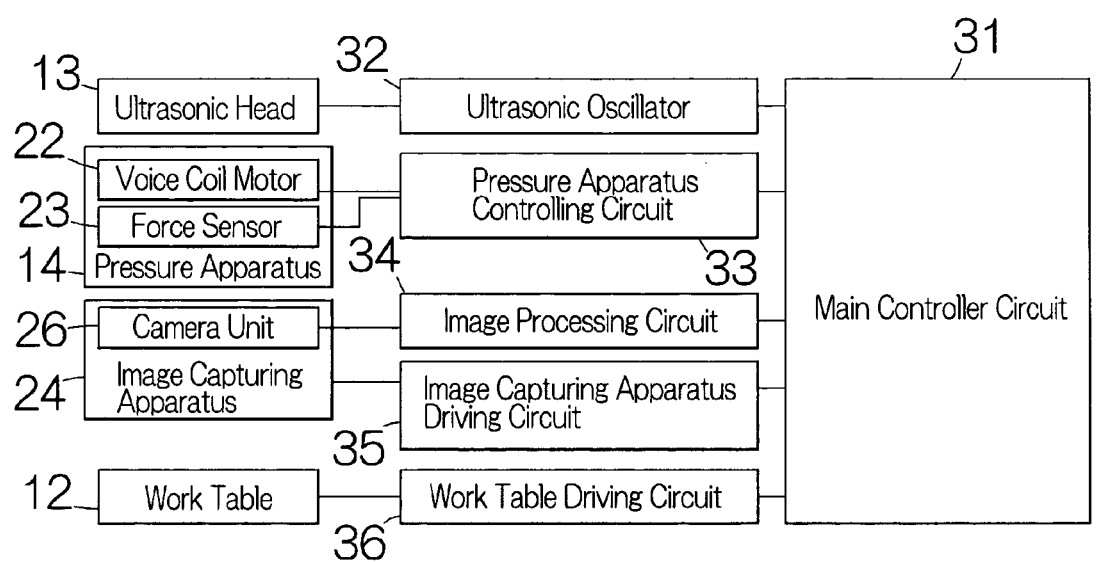
FIG. 2 is a block diagram schematically illustrating the control system of the ultrasonic bonding machine.

As shown in FIG. 2, the ultrasonic bonding machine 11 includes a main controller circuit 31. The main controller circuit 31 is designed to control the operation of the ultrasonic bonding machine 11 in accordance with a predetermined software program. An ultrasonic oscillator 32 is connected to the main controller circuit 31. The ultrasonic oscillator 32 serves to control the oscillation of the ultrasonic head 13. The ultrasonic oscillator 32 will be described later in detail.

A pressure apparatus controlling circuit 33 is connected to the main controller circuit 31. The pressure apparatus controlling circuit 33 is designed to supply the coil 22b with electric current. The vertical movement of the movable member 17 is controlled in response to the supply of the electric current.

The force sensor 23 is connected to the pressure apparatus controlling circuit 33. The pressure apparatus controlling circuit 33 controls the supply of the electric current to the coil 22b of the voice coil motor 22 based on the electric signal output from the force sensor 23. The load of the support shaft 15 is in this manner maintained at a set value. Servo control may be realized in the pressure apparatus controlling circuit 33 based on the output from the force sensor 23.

An image processing circuit 34 is connected to the main controller circuit 31. The image processing circuit 34 is designed to supply the camera unit 26 with a predetermined control signal. The camera unit 26 is designed to capture images in response to the supply of the control signal. The image processing circuit 34 analyzes the images output from the camera unit 26. A predetermined control signal may be supplied to the image processing circuit 34 from the main controller circuit 31 so as to realize the supply of the control signal from the image processing circuit 34.

An image capturing apparatus driving circuit 35 is connected to the main controller circuit 31. The image capturing apparatus driving circuit 35 is designed to supply a predetermined electric signal to an electric motor incorporated within the image capturing apparatus 24, for example. A predetermined control signal may be supplied to the image capturing apparatus driving circuit 35 from the main controller circuit 31 so as to realize the supply of the electric signal. The image capturing apparatus 24 is allowed to move in the horizontal direction based on the supplied electric signal.

A work table driving circuit 36 is connected to the main controller circuit 31. The work table driving circuit 36 is designed to supply a predetermined electric signal to an electric motor incorporated within the work table 12, for example. A predetermined control signal may be supplied to the work table driving circuit 36 from the main controller circuit 31 so as to realize the supply of the electric signal. The work table 12 is allowed to move in the horizontal direction based on the supplied electric signal.

A brief description will be made on the operation of the ultrasonic bonding machine 11. A printed circuit board is placed on the upper flat surface of the work table 12. A circuit chip is held on the ultrasonic head 13. Ball bumps are arranged on the lower surface of the chip. Conductive pads are likewise arranged on the upper surface of the printed circuit board in an array identical to that of the ball bumps. The ball bumps and conductive pads may be made of an electrically conductive material such as copper, for example. A position mark is printed on the lower surface of the chip. A position mark is likewise printed on the upper surface of the printed circuit board so as to identify the expected position of the chip.

The camera unit 26 is driven to move into a space between the ultrasonic head 13 and the work table 12. The camera unit 26 is positioned between the chip and the printed circuit board. The image capturing apparatus driving circuit 35 outputs a predetermined electric signal based on a control signal supplied from the main controller circuit 31.

When the camera unit 26 has been positioned, the camera unit 26 is forced to capture images in response to the supply of the control signal from the image processing circuit 34. The camera unit 26 simultaneously captures the images of the printed circuit board and the chip. The image data is then supplied to the image processing circuit 34. The image processing circuit 34 then analyzes the supplied image data. The image processing circuit 34 thus detects the position marks on the chip and the printed circuit board based on the analysis of the image data. The position of the printed circuit board and the chip can in this manner be identified within the xyz-coordinate system.

The printed circuit board is then positioned relative to the chip. The work table 12 is driven to move in the horizontal direction so as to align the work table 12. The work table driving circuit 36 outputs an electric signal based on a control signal from the main controller circuit 31. The main controller circuit 31 generates the control signal based on the output from the image processing circuit 34.

When the printed circuit board has been aligned with the chip, the ultrasonic head 13 is lowered. The ball bumps are received on the corresponding conductive pads. The ultrasonic head 13 serves to urge the chip against the printed circuit board. The coil 22b of the voice coil motor 22 receives an electric signal from the pressure apparatus controlling circuit 33 in this case. The pressure apparatus controlling circuit 33 serves to keep the urging force constant.

While the ultrasonic head 13 is urged against the upper flat surface of the work table 12, the ultrasonic oscillator 32 induces the ultrasonic vibration of the ultrasonic head 13. The chip is caused to move in the horizontal direction relative to the printed circuit board by a minute amplitude.

The ultrasonic energy allows exchanged metallic atoms to diffuse into the ball bumps and the conductive pads at the contacts between the ball bumps and the conductive pads. The ball bumps are in this manner bonded to the corresponding conductive pads.

Figure 3:
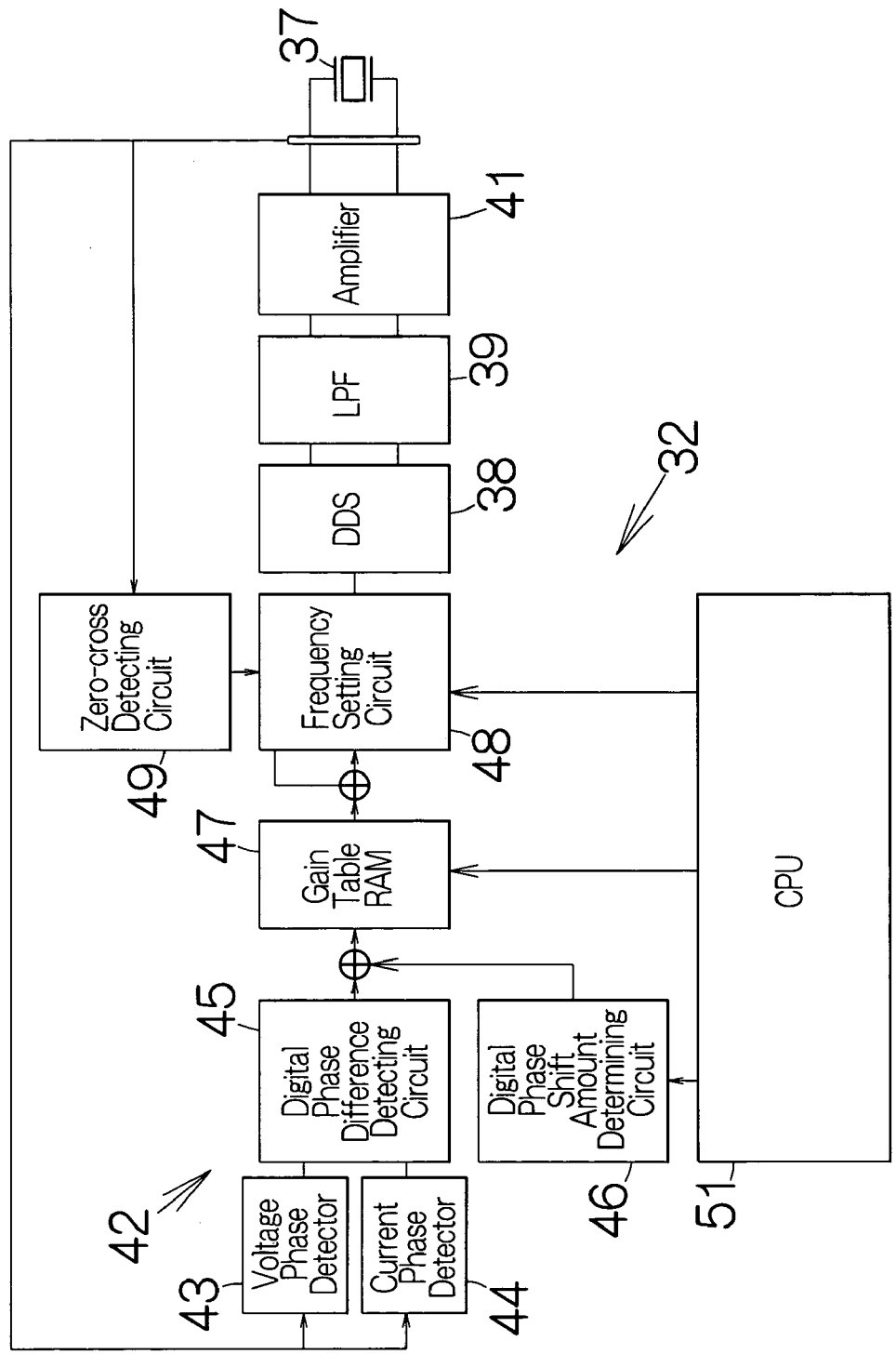
FIG. 3 is a block diagram schematically illustrating the structure of an oscillator.

Next, description will be made on the structure of the ultrasonic oscillator 32. As shown in FIG. 3, for example, the ultrasonic oscillator 32 includes a transducer 37 incorporated within the ultrasonic head 13. A bolt clamped Langevin type transducer, BLT, is employed as the transducer 37, for example. As conventionally known, the bolt clamped Langevin type transducer comprises a layered piezoelectric elements. The bolt is used to clamp the piezoelectric elements.

A direct digital synthesizer, DDS, 38 is connected to the transducer 37. The direct digital synthesizer serves as a driver of the present invention. The direct digital synthesizer 38 is designed to output a waveform signal such as a sine wave signal, for example, based on a look-up table, not shown. When the frequency of the waveform signal coincides with the resonant frequency of the transducer 37, the transducer 37 oscillates. The waveform signal, namely the driving signal is amplified at an amplifier 41 after regulation at a low-pass filter, LPF, 39. The driving signal is input into the transducer 37 after the amplification.

A digital phase lock loop circuit 42 is connected to the direct digital synthesizer 38. The digital phase lock loop circuit 42 includes a voltage phase detector 43 and a current phase detector 44. The voltage phase detector 43 is designed to detect the phase of the voltage from the driving signal for the transducer 37. The current phase detector 44 is likewise designed to detect the phase of the current from the driving signal for the transducer 37. If the frequency of the driving signal coincides with the resonant frequency of the transducer 37, the phase of the voltage coincides with the phase of the current. The phase difference is thus removed between the phase of the voltage and the phase of the current.

A digital phase difference detecting circuit 45 is connected to the voltage and current phase detectors 43, 44. The digital phase difference detecting circuit 45 is designed to calculate the phase difference between the phase of the voltage and the phase of the current based on the outputs from the voltage phase detector 43 and the current phase detector 44. A digital phase shift amount determining circuit 46 serves to modify the phase difference calculated at the digital phase difference detecting circuit 45. The digital phase shift amount determining circuit 46 is designed to modify the phase difference based on a predetermined amount of phase shift. The amount of phase shift is set unique to the voltage phase detector 43 and the current phase detector 44, for example.

A gain table RAM 47 is connected to the digital phase difference detector 46. The gain table RAM 47 holds gain data at the individual addresses. The gain data represents the loop gain of the phase lock loop circuit 42. The magnitude of the loop gain depends on the amount of phase difference. When the address is designated based on the phase difference, the corresponding gain data is output from the gain table RAM 47. The gain table RAM 47 in this manner functions as a so-called look-up table.

A frequency setting circuit 48 is connected to the gain table RAM 47. The frequency setting circuit 48 is designed to calculate the driving frequency of the transducer 37 based on the gain data output from the gain table RAM 47. The frequency setting circuit 48 adds the gain data to the current frequency. The target driving frequency is in this manner determined. The determined target driving frequency is supplied to the direct digital synthesizer 38. The frequency of the driving signal output form the direct digital synthesizer 38 is in this manner changed.

A zero-cross detecting circuit 49 is connected to the frequency setting circuit 48. The zero-cross detecting circuit 49 detects the position of the zero-cross of the driving signal. The detected timing of the zero-cross is reported to the frequency setting circuit 48.

A central processing unit, CPU, 51 is connected to the digital phase shift amount determining circuit 46, the gain table RAM 47 and the frequency setting circuit 48. The central processing unit 51 supplies the digital phase shift amount determining circuit 46 with an amount of phase shift. The central processing unit 51 is allowed to update the gain data stored in the gain table RAM 47. The gain data is prepared for each of the ultrasonic heads 13 or the each kind of the ultrasonic heads 13, for example. The central processing unit 51 supplies a reference frequency to the frequency setting circuit 48. The reference frequency corresponds to the initial value of the driving signal. The direct digital synthesizer 38 starts generating the driving signal based on the reference frequency.

Now, assume that the transducer 37 is driven to oscillate. The central processing unit 51 previously supplies the reference frequency to the frequency setting circuit 48. The frequency setting circuit 48 reports the direct digital synthesizer 38 of the reference frequency. The direct digital synthesizer 38 thus generates the waveform signal based on the reference frequency. The generated waveform signal, namely the driving signal, is supplied to the transducer 37. The transducer 37 oscillates at the frequency of the driving signal. The reference frequency corresponds to the resonant frequency of the ultrasonic head 13, so that the ultrasonic head 13 oscillates.

When the chip held on the ultrasonic head 13 contacts with the printed circuit board, the resonant frequency of the ultrasonic head 13 changes. This change generates a phase difference between the phase of the voltage and the phase of the current in the driving signal. The digital phase difference detecting circuit 45 detects the phase difference. The detected phase difference is utilized to designate the address of the gain table RAM 47. The loop gain is extracted from the designated address. The frequency setting circuit 48 adds the frequency of the extracted loop gain to the current frequency. The target driving frequency is in this manner calculated.

When the target driving frequency has been calculated, the frequency setting circuit 48 sets a new driving frequency for the direct digital synthesizer 38. Here, the frequency setting circuit 48 detects the point of zero-cross and simultaneously sets the driving frequency. The point of zero-cross is reported from the zero-cross detecting circuit 49. The frequency of the waveform signal is changed right after the zero-cross. The transducer oscillates at the new frequency. These operations are repeated so that the frequency of the vibration of the transducer follows the change in the resonant frequency of the ultrasonic head 13. The ultrasonic head 13 keeps oscillating. The amplitude of the oscillation is kept constant at the ultrasonic head 13.

A larger loop gain contributes to a quicker response of the driving signal to the change in the resonant frequency. The oscillation of the ultrasonic head 13 thus gets stabilized in a shorter period. On the other hand, if the loop gain is excessively large, the ultrasonic head 13 cannot follow the change of the frequency. The ultrasonic head 13 gets disordered. The ultrasonic head 13 cannot be controlled well. If the loop gain is smaller, the driving frequency of the ultrasonic head 13 cannot reach the target frequency in a shorter period. In this case, the driving frequency cannot be raised for the ultrasonic head 13. A larger loop gain is preferably set in the gain table RAM 47. The driving frequency can thus be raised for the ultrasonic head 13.

Now, assume that the ultrasonic head 13 is replaced with new one. The central processing unit 51 selects a loop gain most suitable for the new ultrasonic head 13. The selected loop gain is written into the gain table RAM 47 at a predetermined address for the respective phase differences. The gain table RAM 47 is in this manner updated. The aforementioned processes are effected based on the updated gain table RAM 47. As a result, the oscillation of the ultrasonic head 13 is maintained well. The amplitude of the oscillation of the ultrasonic head 13 is kept constant. If a common loop gain is set for all of the ultrasonic heads 13, the loop gain must take the smallest value. Accordingly, the resonant frequency of the ultrasonic head 13 cannot be improved. The driving frequency cannot be raised.

The loop gain is prepared for each of the ultrasonic heads 13. When the loop gain is to be determined, a driving frequency is supplied to the ultrasonic head 13 for realizing a predetermined amplitude. The driving frequency is composed of the direct component of the electric current. The alternating component of a predetermined frequency is superimposed on the direct component. One should observe whether or not the oscillation of the ultrasonic head 13 follows the alternating component. As long as the oscillation of the ultrasonic head 13 follows the alternating component, the frequency of the alternating component can be determined as the loop gain. The observation reveals a loop gain set for each of the ultrasonic heads 13.

The central processing unit 51 may calculate a loop gain based on a linear function, a quadric, or the like, for example. In this case, a predetermined coefficient may be set between the phase difference and the loop gain. Increase of the coefficient leads to an increase in the loop gain. The central processing unit 51 is thus allowed to use the maximum coefficient for the respective ultrasonic heads 13 in calculation of the loop gain.

What is claimed is:

1. An oscillating apparatus comprising:
   a transducer;
   a voltage phase detector detecting a phase of a voltage from a driving signal for the transducer;
   a current phase detector detecting a phase of a current from the driving signal for the transducer;
   a phase difference detector detecting a phase difference between the phase of the voltage and the phase of the current;
   a phase shift amount determining unit modifying the phase difference based on a predetermined amount of phase shift to generate a modified phase difference;
   a memory receiving the modified phase difference, the memory outputting gain data specifying gains corresponding to the modified phase difference; and
   an arithmetic unit calculating a driving frequency for the transducer based on the gain data.

2. The oscillating apparatus according to claim 1, wherein the memory holds a table containing the gain data corresponding to a characteristic of the transducer.

3. The oscillating apparatus according to claim 2, further comprising a processing unit controlling the oscillating apparatus, wherein the gain data contained in the table is rewritable by the processing unit.

4. The oscillating apparatus according to claim 1, further comprising a zero-cross detector detecting a zero-cross point of the driving signal, the zero-cross detector outputting to the arithmetic unit signal indicating the zero-cross point.

5. An oscillating apparatus comprising:
   a transducer;
   a voltage phase detector detecting phase of a voltage from a driving signal for the transducer;
   a current phase detector detecting phase of a current from the driving signal for the transducer;
   a phase difference detector detecting a phase difference between the phase of the voltage and the phase of the current;
   a phase shift amount determining unit modifying the phase difference based on a predetermined amount of phase shift to generate a modified phase difference; and
   a memory receiving the modified phase difference, the memory outputting gain data specifying gains corresponding to the modified phase difference.

6. An ultrasonic bonding apparatus comprising:
   a controller;
   an ultrasonic head; and
   an ultrasonic oscillator generating a driving signal for driving the ultrasonic head, wherein the ultrasonic oscillator includes:
     a phase difference detector detecting a phase difference between a phase of a voltage of the driving signal and a phase of a current of the driving signal;
     a phase shift amount determining unit modifying the phase difference based on a predetermined amount of phase shift to generate a modified phase difference; and
     a memory receiving the modified phase difference, the memory outputting gain data for driving the ultrasonic head, the gain data specifying gains corresponding to the modified phase difference;
   a table moveable within a horizontal plane, the table receiving therein a work to be bonded; and
   a supporting unit supporting the ultrasonic head for relative movement.

7. An oscillating apparatus comprising:
   a transducer driven by a driving signal;
   a phase difference detector detecting a phase difference between a phase of a voltage of the driving signal and a phase of a current of the driving signal;
   a phase shift amount determining unit modifying the phase difference detected at the phase difference detector based on a predetermined amount of phase shift to generate a modified phase difference;
   a memory receiving the modified phase difference, the memory outputting gain data specifying gains corresponding to the modified phase difference; and
   an arithmetic unit calculating a driving frequency of the transducer based on the gain data.

* * * * *